E. PAULSON.
SHOCK CARRIER.
APPLICATION FILED SEPT. 9, 1911.
1,057,768.
Patented Apr. 1, 1913.
3 SHEETS—SHEET 2.
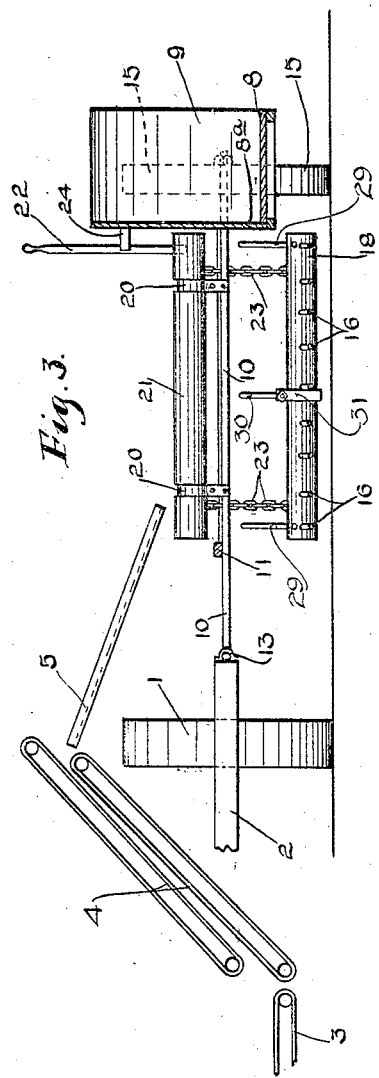
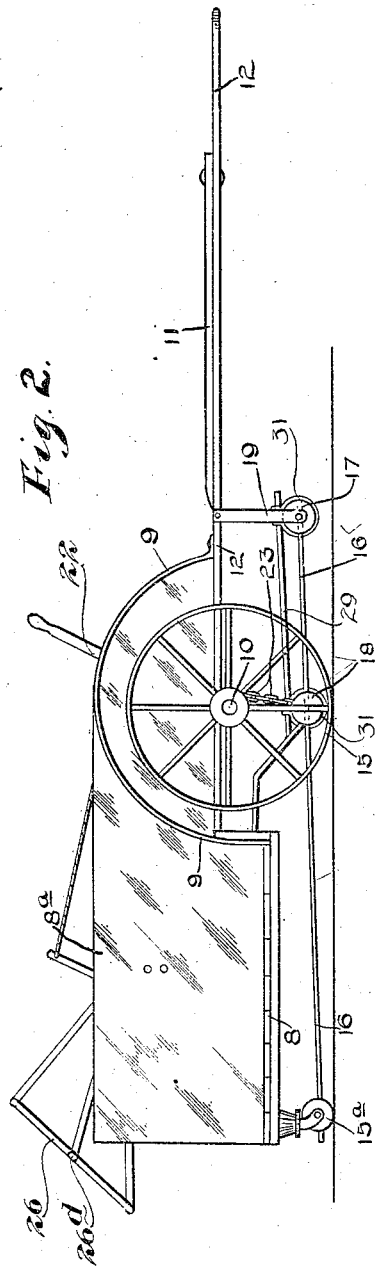
Witnesses.
H. L. Opsahl.
H. A. Hillgren.
Inventor
Erland Paulson.
By his Attorneys
Williamson Merchant

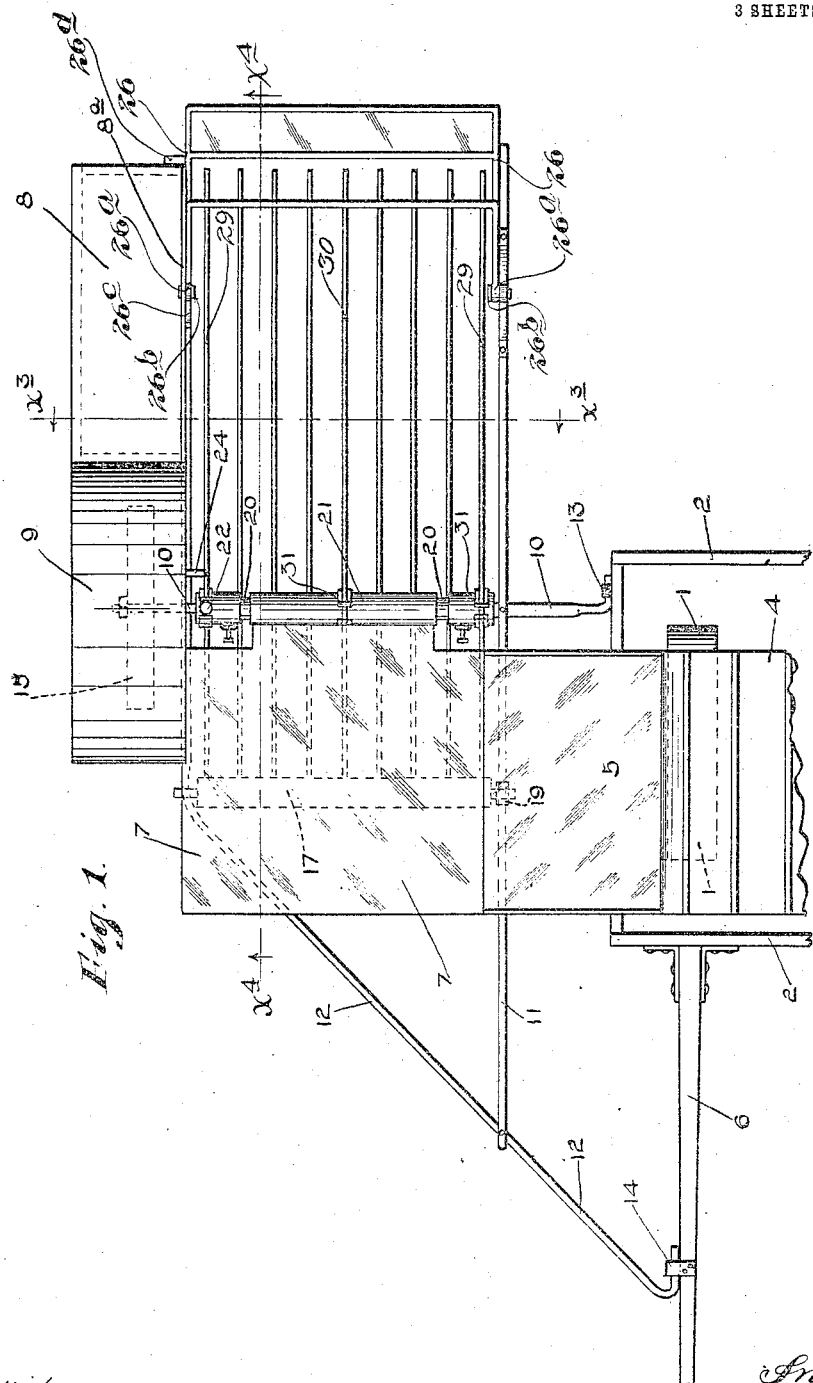

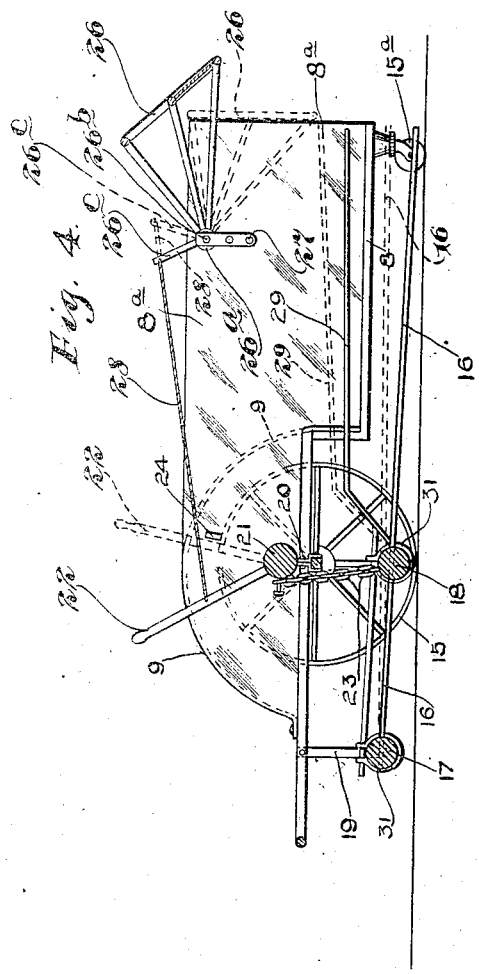

UNITED STATES PATENT OFFICE.

ERLAND PAULSON, OF KNIFE RIVER, NORTH DAKOTA.

SHOCK-CARRIER.

1,057,768.

Specification of Letters Patent.

Patented Apr. 1, 1913.

Application filed September 9, 1911. Serial No. 648,491.

*To all whom it may concern:*

Be it known that I, ERLAND PAULSON, a citizen of the United States, residing at Knife River, in the county of Dunn and State of North Dakota, have invented certain new and useful Improvements in Shock-Carriers; and I do hereby declare the following to be a full, clear, and exact description of the invention, such as will enable others skilled in the art to which it appertains to make and use the same.

My invention has for its object to provide a simple and highly efficient shock carrier, especially adapted for use in connection with a harvester, and to such ends, generally stated, the invention consists of the novel devices and combinations of devices, hereinafter described and defined in the claims.

In the accompanying drawings which illustrate the invention, like characters indicate like parts throughout the several views.

Referring to the drawings, Figure 1 is a plan view showing my improved shock carrier, and a portion of the harvester to which it is attached; Fig. 2 is a right side elevation of the shock carrier; Fig. 3 is a transverse section taken on the line $x^3$ $x^3$ of Fig. 1, the parts of the harvester being indicated only in part, and chiefly in diagram; and Fig. 4 is a longitudinal section taken on the line $x^4$ $x^4$ of Fig. 1.

Of the parts of the harvester, it is only necessary for the purposes of this case, to note the traction wheel 1, the harvester frame 2, the endless platform apron 3, the endless elevator aprons 4, the binder deck 5, and the pole 6. The framework of the shock carrier or shock carrying attachment comprises a bundle receiving table 7, an operating platform 8, a hood 9, a transverse axle bar 10 and longitudinal frame bars 11 and 12, which parts are all rigidly connected. The inner end of the axle bar 10 is rigidly but detachably secured to the adjacent end of a harvester frame 2, preferably by a clamp 13, and the front portion of the outer frame bar 12 is bent obliquely toward the pole 6, and its front end is rigidly but detachably connected to said pole, preferably by a clamp 14. The outer portion of the shock carrier is supported on a main wheel 15 and a caster wheel 15ª, the former of which is loosely journaled on the outer end of the axle bar 10 and is located immediately under the hood 9, while the latter is applied to the rear portion of the operator's platform 8. The inner edge of the bundle receiving table 7 is overlapped by the delivery end of the binder deck 5, so that the bound bundles will be discharged directly onto the said table.

The so-called drop deck is arranged to work below and at the rear of the table 7 and between the operator's platform 8 and the inner frame bar 11. This drop deck, for an important reason, is made up of a multiplicity of long laterally spaced bars or rods 16 unconnected at their rear free ends, but at their forward portions, securely tied together, preferably, by a pair of transverse tie bars or members 17 and 18. The front bar 17, at its ends, is journaled on the lower ends of hanger brackets 19, the upper ends of which are secured, one to the frame bar 11, and the other to the frame bar 12. Journaled in suitable bearings 20 on the rear portion of the table 7, is a windlass shaft 21 which, at its outer end, is shown as provided with an operating lever 22. This windlass shaft 21 is connected to the underlying bar 18 of the drop deck, preferably by a pair of short chains 23. By means of the lever 22, the operator standing on the platform 8, may raise and lower the drop deck 16, at will. Normally, or while bundles are being deposited thereon, the said deck is held in an elevated approximately horizontal position, as shown by dotted lines in Fig. 4, and at this time, the lever 22 may be held by any suitable lock device, such for instance, as a lock lug bracket 24, shown as secured to the inner side of the hood 9, and with which, the said lever 22 is adapted to be engaged by a slight lateral springing movement. Any other suitable lever lock might be provided.

The operator's platform 8 is preferably provided on its inner side with a rigidly secured guard board 8ª. Extended across the shock carrier, above and at the rear of the drop deck 16, is a so-called tail gate 26 having inwardly projecting side members which work between the guard board 8ª and the frame bar 11. As shown, the tail gate 26 is preferably made up of a multiplicity of spaced bars tied together at suitable points. The extreme inner end portions of the sides of the tail gate 26 terminate in hub portions 26ª having secured thereto trunnions 26ᵇ that are journaled in bearings 27 secured to the guard board 8ª and the frame bar 11. Rigidly secured to one of the hubs 26ª, as shown in Fig. 4, is a short upwardly projecting lever 26ᶜ connected to the lever 22 by means of a flexible cable 28. To limit the downward movement of the tail gate 26, the same is provided with a stop 26ᵈ that engages the rear vertical edge of the guard board 8ª.

To hold the bundles in position while the shock is being formed on the drop deck 16, retaining rods 29 and 30 are provided. These rods are located at considerable distance above, but extended approximately parallel to the rods of the deck 16, and at their front ends, they are suitably secured to the tie bars 17 and 18. The outer retaining rods 29 may be permanently secured to the said bars 17 and 18, but the centrally located retaining rod 30 should be made detachable so that it may be removed when shocking loose grain. As shown, said rods 29 and 30 are detachably secured to the bars 17 and 18 by clamps 31.

The operation and use of the shock carrier are substantially as follows: The bundles are delivered from a binder in succession onto the receiving table 7. The operator stands on the platform 8, preferably with a fork, and picks up the bundles from the table 7 and properly forms a shock therewith, upon the drop deck 16. The guard plate or side board 8ª and the inner bar 11 form the side members, and the tail gate 26 forms the rear member of the shock containing receptacle, of which, the drop deck 16 constitutes the bottom. The said tail gate therein, at this time, prevents the bundles from being discharged from the drop deck. When the shock has been properly accumulated, the operator lets down the said drop deck, as shown by full lines in the drawings, by manipulation of the lever 22 and coöperating windlass; and then this causes the lower ends of portions of the bundles to engage the stubble on the ground, so that under further forward movement of the machine, the lowered shock will be left standing on the ground and the bars or rods of the said drop deck will be drawn outward from under the shock. In this way, a well formed shock may be deposited without danger of the shock being disordered or thrown out of form. By the same operation of the lever 22, that lowers the drop deck 16, the tail gate 26 is raised, by means of the cable 28, into the position shown in Figs. 2 and 4 and in which position the shock can pass thereunder, under the advanced movement of the machine. When the drop deck 16 is moved into an elevated position by means of the lever 22, the tail gate 26 will drop into a closed position under the action of gravity.

It requires at least three or more men to follow two harvesters and properly form shocks of the bundles bound and discharged thereby. One man, standing on the platform 8 may shock the bundles and operate the attachment with ease. Hence, the work of shocking is made easier for the workmen and there is a very considerable economy in the amount of labor necessarily employed in shocking.

The device may be constructed at comparatively small cost and is so designed that it may be readily applied to any standard harvester.

What I claim is:

1. In a bundle carrier, the combination with a frame work having a supporting wheel and means for connecting the same to a harvester, of a receiving deck secured to said frame work, a drop deck comprising laterally spaced bars or rods pivotally connected, at their front ends, to said frame work, a windlass shaft, means for operating said windlass shaft, a flexible connection between said windlass shaft and the intermediate portion of said drop deck, a movable tail gate normally held crosswise of the rear portion of said drop deck, and a connection extending from said means for operating said windlass shaft, for operating said tail gate, substantially as described.

2. In a bundle carrier, the combination with a framework having a supporting wheel and means for connecting the same to a harvester, of a receiving deck secured to said framework, a drop deck comprising laterally spaced bars or rods connected at their front and intermediate portions, said drop deck being pivotally connected to said framework beneath said receiving deck at its forward end, a windlass shaft, means for operating said windlass shaft, a flexible connection between said windlass shaft and the intermediate portion of said drop deck, a movable tail gate normally held crosswise of the rear portion of said drop deck, and a connection extending from the said means for operating the windlass shaft for operating said tail gate.

3. In a bundle carrier, the combination with a frame work having a supporting wheel and means for connecting the same to a harvester, of a receiving deck secured to said frame work, a drop deck comprising laterally spaced bars or rods pivotally connected, at their front ends, to said frame work, a removable retaining rod, secured, at one end, to the front of said drop deck and having its other end extended in the same general direction as said drop deck, and located above the same, a windlass shaft, means for operating said windlass shaft, a flexible connection between said windlass shaft and the intermediate portion of said drop deck, a movable tail gate normally held crosswise of the rear portion of said drop deck, and a connection extending from said means for operating said windlass shaft, for operating said tail gate, substantially as described.

In testimony whereof I affix my signature in presence of two witnesses.

ERLAND PAULSON.

Witnesses:
V. A. BAKER,
J. A. EBERHARD.